US009499427B2

(12) United States Patent
Olivier et al.

(10) Patent No.: US 9,499,427 B2
(45) Date of Patent: Nov. 22, 2016

(54) ARTICULATED BENDING SUPPORT

(71) Applicant: SAINT-GOBAIN GLASS FRANCE, Courbevoie (FR)

(72) Inventors: Thierry Olivier, Thourotte (FR); Christophe Machura, Chevincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/947,607

(22) Filed: Nov. 20, 2015

(65) Prior Publication Data

US 2016/0075588 A1 Mar. 17, 2016

Related U.S. Application Data

(63) Continuation of application No. 14/382,974, filed as application No. PCT/FR2013/050417 on Feb. 28, 2013, now Pat. No. 9,193,619.

(30) Foreign Application Priority Data

Mar. 6, 2012 (FR) ..................................... 12 52038

(51) Int. Cl.
*C03B 23/027* (2006.01)
(52) U.S. Cl.
CPC ............. *C03B 23/027* (2013.01); *Y02P 40/57* (2015.11)
(58) Field of Classification Search
CPC .................................................. C03B 23/027
See application file for complete search history.

(56) References Cited

U.S. PATENT DOCUMENTS

| 2,925,688 A | 2/1960 | Carson |
| 5,660,609 A | 8/1997 | Muller et al. |
| 2010/0236290 A1 | 9/2010 | Fukami et al. |
| 2011/0123730 A1 | 5/2011 | Chiappetta et al. |

FOREIGN PATENT DOCUMENTS

| EP | 0 705 798 | 4/1996 |
| WO | WO 2007/077371 | 7/2007 |

OTHER PUBLICATIONS

International Preliminary Report on Patentability issued in International Patent Application No. PCT/FR2013/050417, dated Jul. 2, 2013.
International Search Report issued for International Application No. PCT/FR2013/050417, dated Jul. 2, 2013.

*Primary Examiner* — Erin Snelting
(74) *Attorney, Agent, or Firm* — Pillsbury Winthrop Shaw Pittman LLP

(57) ABSTRACT

A process for gravity bending of a glass sheet on a support including a chassis, a first frame and a second frame, the second frame being articulated and including a mobile lateral part that passes from an open position to a closed position by an articulation during the bending procedure, the bending of the sheet beginning on the first frame while the second frame is in the open position, and finishing on the second frame in the closed position, the sheet passing from the first frame to the second frame during the bending procedure as a result of the relative vertical movement of the first and second frame and of the raising of the mobile part of the second frame, the contact area of the first frame with the glass sheet located in a vertical line with the articulation being above the articulation at the instant the latter is closed.

15 Claims, 4 Drawing Sheets

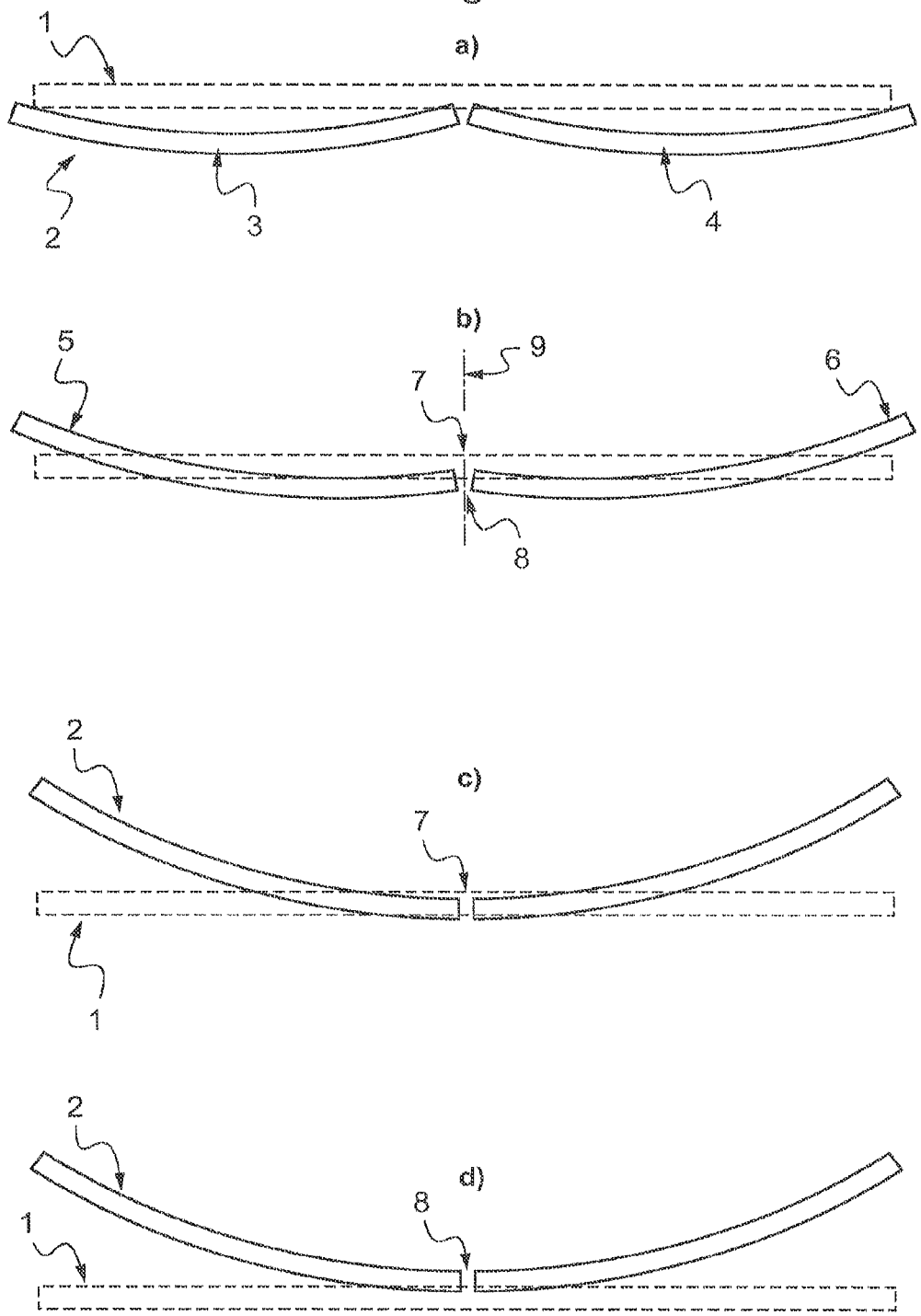

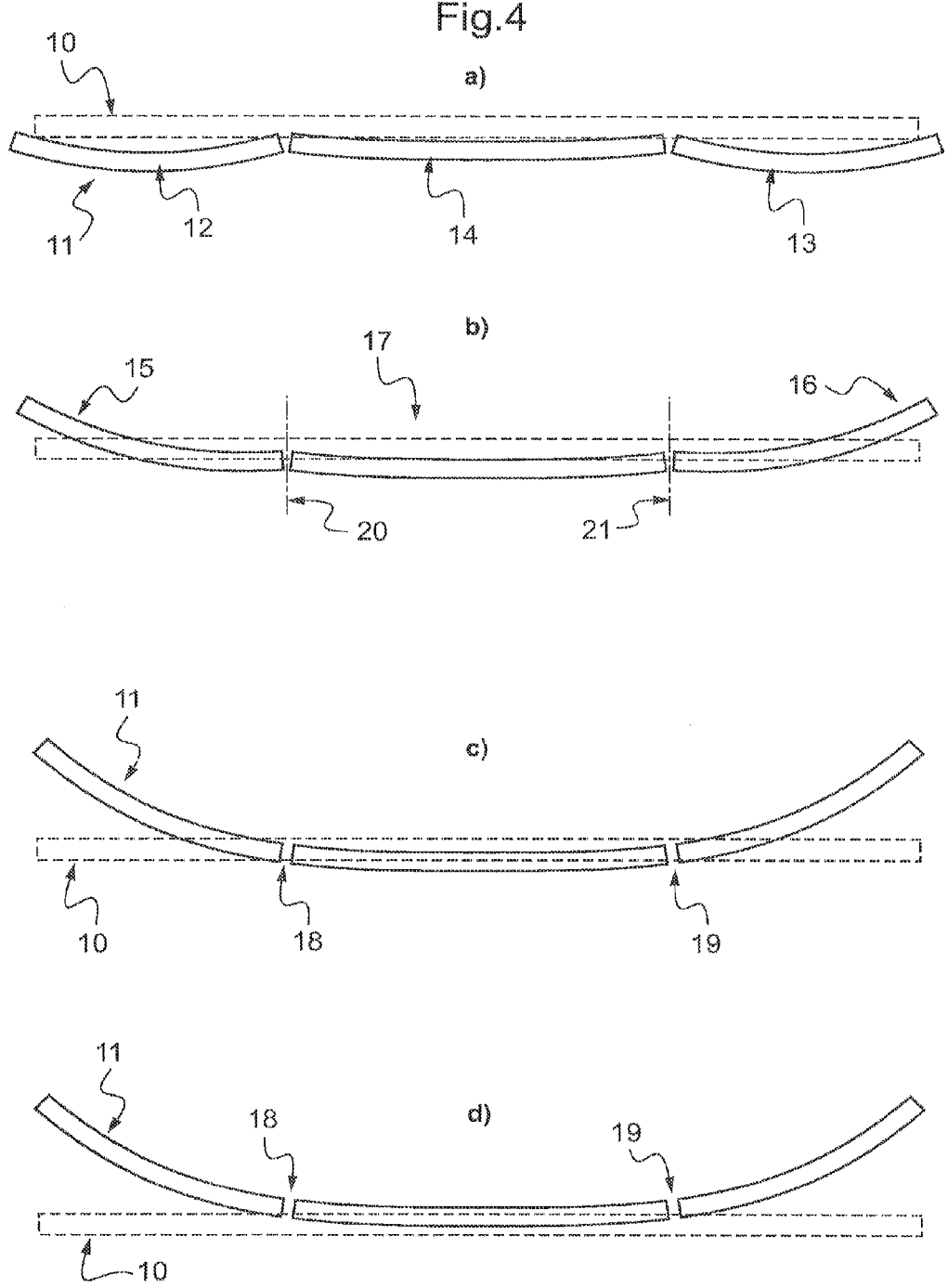

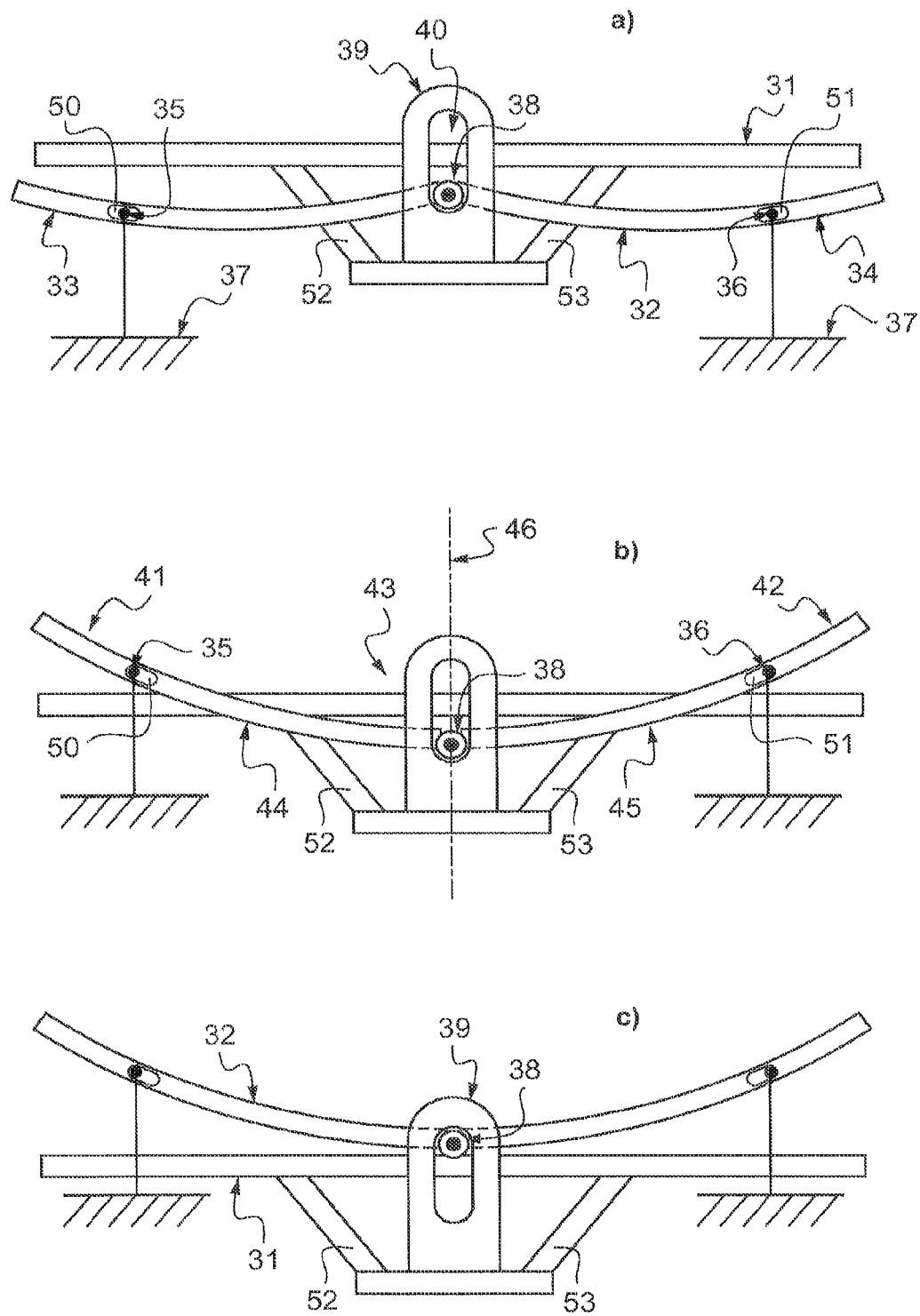

ARTICULATED BENDING SUPPORT

CROSS REFERENCE TO RELATED APPLICATIONS

This application is a continuation of U.S. application Ser. No. 14/382,974, filed Sep. 4, 2014, which is the U.S. National Stage of PCT/FR2013/050417, filed Feb. 28, 2013, which in turn claims priority to French Patent Application No. 1252038, filed Mar. 6, 2012. The contents of all of these applications are incorporated herein by reference in their entirety.

The invention relates to a bending device comprising at least two bending frames, in particular of skeleton type, that support a glass sheet successively and at least one of which is articulated. The bent glass sheet may be intended for equipping a vehicle, in particular a motor vehicle and being incorporated, for example, into a windshield or a rear window.

Managing the formation of curvatures of glass sheets at the bending temperature (generally between 600° C. and 700° C.) requires the use of more or less complex bending supports, the geometry of which varies during the bending. Supports are known that comprise two skeletons having different curvatures that pick up the glass sheet one after the other. Generally, the first skeleton has less pronounced curvatures than the second skeleton. The first frame may be referred to as a "sketcher" and the second frame may be referred to as a "finisher". The sketcher has smaller curvatures than the finisher and may even in certain cases be flat. The glass sheet takes on its final shape on the finisher skeleton. In order to comply with the desired curvatures even more and minimize the optical defects, it is sometimes preferable for the finisher to have articulations that are mobile during the bending. Specifically, the deformation of a glass sheet on a non-articulated frame may result in a sliding of the edges of the sheet over the frame which may be the cause of undulations. This sliding phenomenon is referred to as "sliding". Equipping a frame with one or more articulations makes it possible to reduce the defects generated by this phenomenon.

The present invention relates to a device for the gravity bending of glass sheets comprising a sketcher frame that is generally not articulated and an articulated finisher frame. Thus, the glass sheet is successively borne by the sketcher then by the finisher with articulations open then by the finisher with articulations closed. It has now been observed that an undesirable mark could be produced on the glass at the location of the articulations when the latter are open and in contact with the glass. To resolve this problem, it has been found that it was advisable, in an intermediate bending phase, to support the glass sheet both by the articulated lateral lo parts of the non-closed finisher and by the longitudinal parts of the sketcher while the finisher is not closed. Within the context of the present application, this phase is referred to as the "intermediate phase". When the finisher is closed, the sketcher is projected downwards with respect to the finisher and the glass sheet is then entirely borne by the finisher in the closed state. This is a relative movement of the two frames with respect to one another and it would also be possible to have the finisher moving upwards. By proceeding in this way, the glass is never in contact with the zone of the articulations of the finisher in the open state. The adjective "closed" used at the location of the finisher means that its articulations are completely raised and in the final position (in order to give the glass sheet its final form). The adjective "open" used at the location of the finisher means that its articulated part or parts are not completely raised and are not in the final position. The use of the terms "lateral" and "longitudinal" does not predict anything with respect to the relative dimensions of the parts thus designated.

Thus, the invention relates to a process for the gravity bending of a glass sheet on a support comprising a chassis, a first frame and a second frame, the second frame being of articulated type and comprising a mobile lateral part that passes from an open position to a closed position by means of an articulation in the course of the bending procedure, the bending of the sheet beginning on the first frame while the second frame is in the open position, and finishing on the second frame in the closed position, the sheet passing from the first frame to the second frame during the bending procedure as a result of the relative vertical movement of the first and second frame and of the raising of the mobile part of the second frame, the contact area of the first frame with the glass sheet located in a vertical line with the articulation being above the articulation at the instant the latter is closed. This means that the intersection, on the one hand, of the vertical line passing through the articulation of the second frame with, on the other hand, the contact area of the first frame with the glass sheet is above the articulation at the instant the articulation is closed.

The invention relates not only to the bending of an individual glass sheet, which may subsequently be tempered and intended, for example, to be used as a rear window of a motor vehicle, but also the bending of at least two glass sheets (generally two glass sheets in total) that have to subsequently be assembled with an intermediate sheet of a polymer such as polyvinyl butyral (PVB) in order to produce laminated glazing, in particular a windshield of a motor vehicle. For the latter type of glazing, it is preferred to carry out the bending of the sheets intended for the same glazing by superposing them since thus they are bent simultaneously and they are thus given exactly the same shape. For the bending, an interlayer powder of silica or of kieselguhr is generally, and in a known manner, introduced between the two sheets in order to prevent them from sticking. This powder is discharged after the cooling and it is then possible to carry out the assembly thereof with the interlayer sheet of polymer material, generally made of PVB.

In particular, the bending on the support begins when the contact area of the first frame with the sheet is entirely above the second frame. Generally, at one point of the bending process, the sheet is entirely supported by the first frame without any contact with the second frame.

In particular, the bending on the support finishes when the contact area of the first frame with the sheet is entirely below the contact area of the second frame with the sheet, the sheet then being entirely supported by the second frame and having no contact with the first frame.

According to the invention, during the intermediate phase, and in particular at the instant when the articulated frame is closed, the glass sheet is supported by the lateral edges of the mobile parts of the second frame and by the longitudinal edges of the first frame.

Preferably, for the relative vertical movement of the first frame and of the second frame and the transfer of the glass sheet from the first frame to the second frame, the first frame passes inside the second frame. According to this variant, the perimeter of the first frame is smaller than the perimeter of the second frame. It is also possible to make the second (articulated) frame pass inside the first frame but this variant is not preferred. Indeed, by placing the first frame entirely inside the second frame when seen from above, when the glass begins to bend under the effect of the combined action of heat and its weight, the edges of the glass sheet overflowing outside of the first frame stick out upwards so that these edges in fact move away from the second frame and do not risk touching it. The part of the sheet inside the first frame can be bent without risking touching the second frame since the latter is on the outside of the first frame. Conversely, if the second frame were placed inside the first frame when seen from above, then there would be a risk that the glass supported by the first frame at the beginning of the bending would prematurely touch the second frame, unless a very large difference in levels between the two frames was provided. An increase in the difference in levels between the two frames represents an increase in the height of the entire bending support which may pose a problem if the furnace inside which it must move is not high enough.

In particular, the articulated frame may comprise a single articulation, which is generally found in the central zone of each of the longitudinal edges of the second frame. Such a frame is then referred to as having "central articulation". Such a frame then consists of two mobile parts each bearing a lateral edge of the frame.

The articulated frame may also comprise two articulations. It then comprises two mobile parts located on either side of a fixed part. The articulated frame then comprises two longitudinal edges, each longitudinal edge being in three parts, including a central part placed between two parts each located on a mobile part.

In particular, for the relative vertical movement of the first frame and of the second frame and the transfer of the glass sheet from the first frame to the second frame, the first frame may descend.

For the relative vertical movement of the first frame and of the second frame, the following three possibilities exist:
descent of the first frame, the second frame being fixed;
ascent of the second frame, the first frame being fixed;
descent of the first frame and ascent of the second frame.

When it is said here that a frame is fixed, this is a fixity in a vertical direction, it being understood that the whole of the support according to the o invention may be made to move horizontally in a furnace. Indeed, the support according to the invention may be mounted on a carriage and be part of a train of identical support carriages passing the glass sheets one after another through a furnace. The movement of the various mobile parts of one of the supports of said train (relative vertical movement of the frames of the support+ closure of the articulated finisher frame) may be activated and carried out while the carriage moves horizontally in the furnace or else at a precise location in the furnace after stopping the carriage.

For the relative vertical movement of the first frame and of the second frame and the transfer of the glass sheet from the first frame to the second frame, it is possible to make provision to pivot the mobile part about a pivot axis fixed to the chassis, said chassis being vertically immobile. The axis itself has a horizontal direction. This pivot axis does not correspond to the axis of a mobile articulation but is found in the length of the longitudinal part of a mobile part. This method of operation is particularly suitable for a frame with a central articulation. The fixity of the chassis is essentially vertical since it can be mounted on a carriage and be part of a train of identical carriages horizontally passing glass sheets one after another through a furnace.

The articulation of a mobile part comprises a horizontal axis. This axis may in particular be fixed horizontally but mobile vertically and able to be moved in an oblong hole made in a guide firmly attached to the first sketcher frame. The guide is fixed with respect to the sketcher. In particular, the support according to the invention may comprise a guide firmly attached to the first frame, said guide being equipped with an oblong orifice, the length of which is vertical, the axis of the articulation being engaged in said orifice and being able to move therein vertically, and for the relative vertical movement of the first frame and of the second frame and the transfer of the glass sheet from the first frame to the second frame, the first frame and also the articulation descend so that the mobile part pivots about the pivot axis fixed to the chassis, the axis of the articulation being at the bottom of the oblong hole, then, when the articulation is closed, the first frame continues to descend until the axis of the articulation is found at the top of the oblong hole.

The frames in question in the present application have a flat upper surface intended to support the glass sheet. Generally, this upper surface has a width of between 1 and 100 mm. The frames may especially be of skeleton type. A skeleton is a thin strip of metal having one of its edges upwards in order to support the glass, the thickness of said edge generally ranging from 1 to 5 mm and more generally from 2 to 3.5 mm. At the end of the bending, the finisher frame is in continuous contact, via its flat upper surface, with the glass. The bending frames, in particular of skeleton type, are preferably coated with a fibrous material of the type of a felt or canvass of metallic and/or ceramic refractory fibers, as is well known to a person skilled in the art. This material is generally referred to as an "interlayer". These felts reduce the marking of the glass. This interlayer fibrous material generally has a thickness ranging from 0.3 to 1 mm. For simplification, it is considered that the interlayer is part of the frame within the meaning of the invention, the term frame also taking on a quite general meaning insofar as it is a support of annular type for the periphery of the glass sheet. Thus, a "contact area of a frame" with the glass sheet is the area of the interlayer if the frame is coated thereby. The two frames in relative vertical movement with respect to one another are sufficiently far apart from one another so as not to rub during said movement. Thus, if they must be equipped with an interlayer, a distance of at least 3 mm and even at least 4 mm is generally provided between the two frames before assembly of the interlayer.

Preferably, the movements of the various parts of the support according to the invention are carried out in a controlled manner, that is to say at a controlled speed, owing to which the glass sheets are very stable on the successive frames and, for example, do not jump around during the activation of a mechanism. Thus, it is possible in particular to use the mechanism described in WO 2007/077371 and in particular its FIGS. 3 and 4 in order to make the sketcher frame descend with respect to the finisher frame. It is therefore sufficient subsequently to connect the mechanism for raising the mobile parts of the finisher to the drop of the sketcher so that all of the movements of the various parts of the support according to the invention (relative vertical movement of the two frames+raising of the mobile parts of the finisher) are controlled. FIG. 5 of the present application shows how it is possible to connect the mechanism for o raising the mobile parts of the finisher to the drop of the sketcher.

The movement of the various mobile elements of the support represent a change in shape of the contact area of the support with respect to the supported glass. This change in shape may be controlled by a control system comprising a movement generator system and a transmission member (which can pass through a wall of the furnace) in order to transmit said movement to the support and control the change in shape. The rate of change in shape is regulated by regulating the speed of the movement generated by the movement generator system, which may be placed outside the furnace. Placing the movement generator system outside the furnace is advantageous if it comprises electromechanical members unable to withstand the bending temperatures. This movement is transmitted to the support by a transmission member. If the movement generator system is placed outside the furnace, the transmission member passes through at least one of the walls of the furnace (encompassing the side walls but also the floor and the roof). The figures described below illustrate the invention applied to simple shapes of glass sheets (rectangular sheets with relatively constant radii of curvature), but it is clearly understood that the invention can be applied to much more complex shapes both as regards the contour of the glass sheets and their radii of curvature.

The invention also relates to the bending support described previously for implementation of the bending process. Thus, the invention also relates to a support for the gravity bending of a glass sheet, comprising a first frame and a second frame, the second frame being of the articulated type and comprising a mobile lateral part that can pass from an open position to a closed position by means of an articulation, the first frame and the second frame being mobile with respect to one another via a relative vertical movement, the relative vertical movement of the frames being connected to the closing or opening movement of the articulation, the contact area of the first frame with the glass sheet and located in a vertical line with the articulation being above the articulation at the moment the latter is closed. The lowering of the first frame (sketcher) with respect to the second frame is accompanied by the closure of the articulation. At the moment when the articulation closes, the contact area of the first frame with the glass sheet and which is located in a vertical line with the articulation is above the articulation. Next, the first frame may continue its descent relative to the second frame and leave the glass sheet resting entirely on the second frame, with the articulation closed.

BRIEF DESCRIPTION OF THE DRAWINGS

FIG. 3 shows the relative positions of two frames of skeleton type and of the articulated parts at various stages of the gravity bending according to an embodiment of the invention;

FIG. 4 shows the relative positions of two frames of skeleton type and of the articulated parts at various stages of the gravity bending according to an embodiment of the invention, and FIG. 5 shows the relative positions of two frames of skeleton type and of the articulated parts at various stages of the gravity bending according to an embodiment of the invention.

FIGS. 1 and 2 show the type of double bending frames (here of skeleton type) to which the invention refers. FIG. 1 shows a support comprising two frames, a virtually flat sketcher 100 and an articulated finisher 101 with central articulation 102. The finisher comprises two mobile parts 103 and 104 that can pivot about an articulation 102 (reference is made to "an articulation" but of course it is a pair of articulations, one per longitudinal edge).

Figure 1:
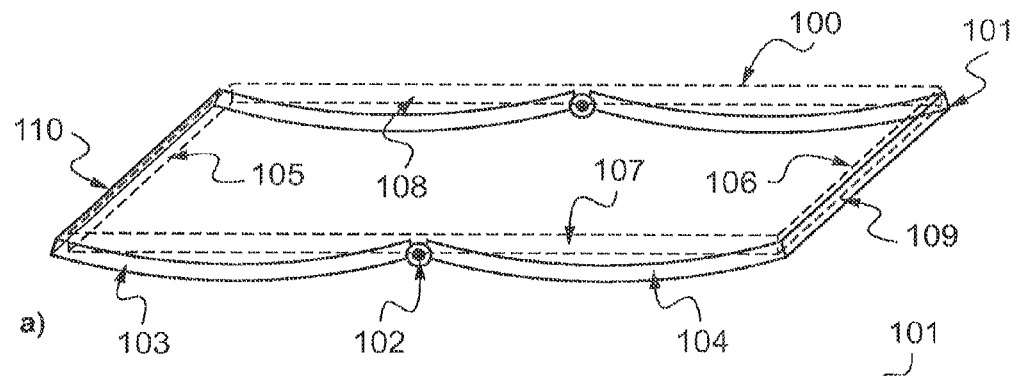
FIG. 1 shows a support comprising two frames, a virtually flat sketcher and a finisher with a central articulation according to an embodiment of the invention.

The sketcher comprises two lateral edges 105 and 106 and two longitudinal edges 107 and 108. The mobile parts of the finisher each comprise a lateral edge 109 and 110 of the finisher. The finisher also comprises two longitudinal edges, each longitudinal edge being divided into two parts within each mobile part. In a), the glass sheet is supported only by the sketcher 100, the finisher being open (mobile parts 103 and 104 not raised) and entirely below the level of the contact area of the sketcher with the glass sheet. The glass sheet begins its bending on the sketcher. Seen from above, the sketcher lies entirely inside of the finisher. During the bending, the sketcher descends and passes entirely inside of the finisher which closes. The glass sheet then passes from the sketcher to the finisher. In b), at the end of the bending, the finisher 101 is closed (mobile parts 103 and 104 raised) and its contact area with the glass is entirely above the contact area of the glass with the sketcher. Thus, the glass no longer has contact with the sketcher 100.

Figure 2:
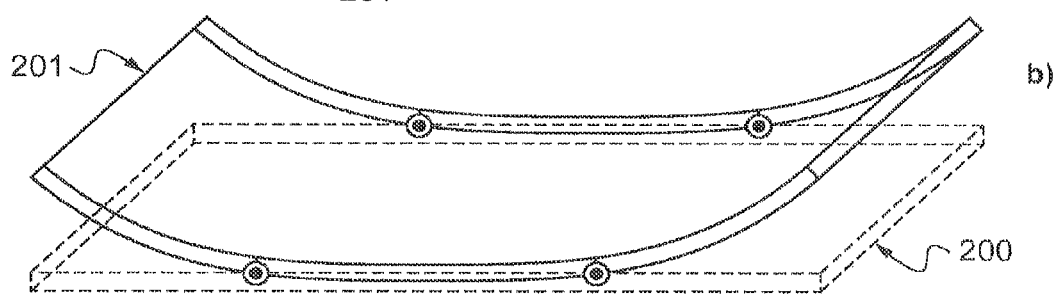
FIG. 2 shows a support comprising two frames, a virtually flat sketcher and a finisher with two articulations according to an embodiment of the invention.

FIG. 2 represents a support comprising two frames, a virtually flat sketcher 200 and a finisher 201 having two articulations 202 and 203 (these are of course two pairs of articulations, each longitudinal edge comprising two articulations per longitudinal edge). The longitudinal edges of the finisher comprise central parts between the two mobile parts. In a), the glass sheet is supported solely by the sketcher 200, the finisher being open (mobile parts 204 and 205 not raised) and entirely below the level of the contact area of the sketcher with the glass sheet. The glass sheet begins its bending on the sketcher. Seen from above, the sketcher lies entirely within the finisher. During the bending, the sketcher descends and passes entirely within the finisher, which closes. The glass sheet then passes from the sketcher to the finisher. In b), at the end of the bending, the finisher 201 is closed (mobile parts 204 and 205 raised) and its contact area with the glass is entirely above the contact area of the glass with the sketcher. Thus, the glass no longer has contact with the sketcher 200.

FIG. 3 represents a bending support comprising two frames of skeleton type, a flat sketcher 1 and a articulated finisher 2 having central articulation comprising two articulated mobile parts 3 and 4. The relative positions of the two skeletons and also that of the articulated parts are seen at various stages of the gravity bending from a) to d). The two skeletons are of annular type and support the periphery of at least one glass sheet. The sketcher lies within the finisher, seen from above. In a), the glass sheet (not represented) rests solely on the sketcher 1. During the bending on the sketcher, the glass sheet does not risk touching the finisher 2. Indeed, it sinks in its internal zone so that its edges rise and even move away from the finisher. In b), the finisher is in the process of closing and its two articulated parts 3 and 4 are slightly raised. At this intermediate stage, the sheet rests both on the ends 5 and 6 of the finisher, which includes the lateral edges of the finisher, and on the central zones 7 of the longitudinal edges of the sketcher. The glass is therefore protected from any contact with the articulation in a vertical line 9 therewith. In c), the articulation 8 of the finisher 2 has just closed completely and the sketcher is still seen just above the articulation of the finisher. The glass sheet is therefore, at this stage, mainly supported by the finisher and also slightly by the sketcher in its central zones 7 of the longitudinal edges and in any case in a vertical line with the articulation. In d), the finisher is in the same state as in c), that is to say completely closed, but the sketcher 1 is retracted downwards, so that the glass sheet is entirely supported by the finisher 2. The procedure from a) to d) shows how it is possible for the glass sheet never to come into contact with the articulation 8 of the finisher if the latter is not completely closed. From a) to d) there was a continuous relative vertical movement of the sketcher and of the finisher making the sketcher pass through the finisher, accompanied by the closure of the finisher.

FIG. 4 represents a bending support comprising two skeletons, a flat sketcher 10 and an articulated finisher 11 comprising two mobile lateral parts 12 and 13 on either side of central parts 14 of longitudinal edges of the finisher. The relative positions of the two skeletons and also that of the articulated parts are seen at various stages of the gravity bending from a) to d). The two skeletons are of annular type and support the periphery of at least one glass sheet. The sketcher is inside the finisher, seen from above. In a), the glass sheet rests solely on the sketcher 10. During the bending on the sketcher, the glass sheet does not risk touching the finisher 11. Indeed, it sinks in its internal zone so that its edges rise and where appropriate even move away from the finisher. In b), the finisher is in the process of closing and its two mobile parts 12 and 13 are slightly raised. At this intermediate stage, the sheet rests both on the ends 15 and 16 of the mobile parts of the finisher, which includes the lateral edges of the finisher, and on the central zones 17 of the longitudinal edges of the sketcher 10. The glass is therefore protected from any contact with the articulations in vertical lines 20 and 21 therewith. In c), the articulations 18 and 19 of the finisher 11 have just closed completely and the sketcher is still seen just above said articulations of the finisher. The glass sheet is therefore, at this stage, supported both by the finisher 11 and also by the sketcher in its central zones 17 of the longitudinal edges. In d), the finisher 11 is in the same state as in c), that is to say with articulations completely closed, but the sketcher 10 is retracted downwards and is below the articulations 18 and 19 so that the glass sheet is entirely supported by the finisher 11. The procedure from a) to d) shows how it is possible for the glass sheet never to come into contact with the articulations 18 and 19 of the finisher if the latter is not completely closed. From a) to d) there was a continuous relative vertical movement of the sketcher and of the finisher making the sketcher pass through the finisher, accompanied by the closure of the finisher.

FIG. 5 represents a bending support comprising two frames of skeleton type, a flat sketcher 31 and an articulated finisher 32 having central articulation comprising two articulated mobile parts 33 and 34. The relative positions of the two skeletons and also that of the articulated parts are seen at various stages of the gravity bending from a) to c). Each mobile part comprises, in its length, a pivot axis 35 and 36, the position of which is fixed with respect to the chassis 37 of the device (the vertical fixity of the chassis is symbolized by the representation of the "ground"). These two pivot axes 35 and 36 do not therefore move in terms of height. The mobile parts 33 and 34 may move slightly with respect to these pivot axes 35 and 36 owing to the oblong holes 50 and 51 made in these mobile parts about these pivot axes. The two mobile parts 33 and 34 are furthermore connected together by another pivot axis 38 in a central position. This pivot axis 38 can be moved vertically in a guide 39 comprising an oblong orifice 40, the length of which is vertical. The axis 38 may move vertically inside the oblong hole 40. The sketcher 31 and the guide 39 are firmly attached together in a fixed manner owing to the connecting elements 52 and 53. From a) to c), the principle of replacing the sketcher by the finisher is that already explained by FIG. 3. In a), only the sketcher bears the glass sheet (not represented) and a first bending takes place thereon. Next, the sketcher begins to descend, which enables the axis 38 to also descend under the effect of the weight of the mobile parts close to the axis 38. This lowering of the axis 38 makes the ends of the mobile parts rise by pivoting about the pivot axes 35 and 36. The ends of the mobile parts then come above the sketcher and partially take charge of the glass sheet. At this stage (stage b) of FIG. 5), the glass sheet rests on the ends 41 and 42 of the mobile parts, which includes the lateral edges of the mobile parts, and on the central zone 43 of the longitudinal parts of the sketcher. The finisher is closed, the ends of its mobile parts being completely raised. Stops (not represented) firmly attached to the chassis mark the end of the raising of the ends of the mobile parts, that is to say also the end of the descent of the zones 44 and 45 of the mobile parts located between the central pivot axis 38 and the pivot axes 35 and 36. At this stage, the sketcher remains above the closed central articulation 38, therefore protecting the glass in the vertical line 46 with the articulation. The sketcher may continue to descend carrying along the guide 39. The pivot axis 38 of the articulation remains fixed with respect to the chassis. It is the guide 39 which continues to descend, so that the central pivot axis 38 is found at the top of the oblong hole at the end of the procedure represented in c). The finisher 32 is then completely above the sketcher 31.

The invention claimed is:

1. A support for the gravity bending of a glass sheet, comprising:
   a first frame and a second frame, the second frame being articulated and comprising a mobile lateral part that can pass from an open position to a closed position by means of an articulation, and
   a mechanism configured to control a closing or opening of the articulation, the mechanism including a guide configured to guide a relative vertical movement of the first frame and the second frame in a manner that the relative vertical movement of the first frame and the second frame creates a closing or opening movement of the articulation,
   wherein the mechanism is configured to close the articulation when the first frame descends relatively to the second frame, and
   wherein the guide is configured to guide the relative vertical movement so that a contact area of the first frame with the glass sheet and located in a vertical line with the articulation is above the articulation at the moment the articulation is closed.

2. The support as claimed in claim 1, wherein at the instant when the articulated second frame is closed, the glass sheet is supported by lateral edges of mobile parts of the articulated second frame and by longitudinal edges of the first frame.

3. The support as claimed in claim 1, wherein for the relative vertical movement of the first frame and of the second frame, one of the first and second frames passes inside the other one of the first and second frames.

4. The support as claimed in claim 1, wherein for the relative vertical movement of the first frame and of the second frame and a transfer of the glass sheet from the first frame to the second frame, the mobile part pivots about a pivot axis fixed to a chassis of the support, said chassis being vertically immobile.

5. The support as claimed in claim 4, wherein the guide is firmly attached to the first frame, said guide being equipped with an oblong orifice, a length of which is vertical, an axis of the articulation being engaged in said oblong orifice and being able to move therein vertically, and wherein for the relative vertical movement of the first frame and of the second frame and a transfer of the glass sheet from the first frame to the second frame, the first frame and the articulation descend so that the mobile part pivots about the pivot axis fixed to the chassis, the axis of the articulation being at a bottom of the oblong orifice, then, when the articulation is closed, the first frame continues to descend until the axis of the articulation is found at a top of the oblong orifice.

6. The support as claimed in claim 1, wherein the articulated second frame comprises two longitudinal edges and a central articulation or two articulations in each of the two longitudinal edges.

7. A support for the gravity bending of a glass sheet, comprising a first frame and a second frame, the second frame being articulated and comprising a mobile lateral part that can pass from an open position to a closed position by means of an articulation, the first frame and the second frame being mobile with respect to one another via a relative vertical movement, the relative vertical movement of the first and second frames being connected to the closing or opening movement of the articulation and a contact area of the first frame with the glass sheet and located in a vertical line with the articulation being above the articulation at the moment the articulation is closed, wherein the first frame is a non-articulated frame.

8. A support for the gravity bending of a glass sheet, the support comprising:
   a non-articulated frame;
   an articulated frame, each of the non-articulated frame and the articulated frame being configured to support the glass sheet, the articulated frame comprising a mobile lateral part that is movable between an open position and a closed position with an articulation, the non-articulated frame and the articulated frame being movable with respect to one another via a relative vertical movement, and
   a guide configured to guide the relative vertical movement of the non-articulated frame and the articulated frame in a manner that the relative vertical movement of the non-articulated frame and the articulated frame creates a closing or opening movement of the articulation,
   wherein the guide is configured to guide the relative vertical movement so that a contact area of the non-articulated frame with the glass sheet and located in a vertical line with the articulation is above the articulation at the moment the articulation is closed.

9. The support as claimed in claim 8, wherein the non-articulated frame is fixed to the guide so that the non-articulated frame and the guide are movable in unison.

10. The support as claimed in claim 8, wherein the guide is movable and limits movement of the mobile part between the closed and open position.

11. The support as claimed in claim 8, wherein at the instant when the articulated frame is closed, the glass sheet is supported by lateral edges of mobile parts of the articulated frame and by longitudinal edges of the non-articulated frame.

12. The support as claimed in claim 8, wherein for the relative vertical movement of the non-articulated frame and of the articulated frame, one of the non-articulated frame and articulated frame passes inside the other one of the non-articulated frame and articulated frame.

13. The support as claimed in claim 8, wherein for the relative vertical movement of the non-articulated frame and of the articulated frame and a transfer of the glass sheet from the non-articulated frame to the articulated frame, the mobile part pivots about a pivot axis fixed to a chassis of the support, said chassis being vertically immobile.

14. The support as claimed in claim 13, wherein the guide is equipped with an oblong orifice, a length of which is vertical, an axis of the articulation being engaged in said oblong orifice and being able to move therein vertically, and wherein for the relative vertical movement of the non-articulated frame and of the articulated frame and a transfer of the glass sheet from the non-articulated frame to the articulated frame, the non-articulated frame and the articulation descend so that the mobile part pivots about the pivot axis fixed to the chassis, the axis of the articulation being at a bottom of the oblong orifice, then, when the articulation is closed, the non-articulated frame continues to descend until the axis of the articulation is positioned at a top of the oblong orifice.

15. The support as claimed in claim 8, wherein the articulated frame comprises two longitudinal edges and a central articulation or two articulations in each of the two longitudinal edges.

* * * * *